United States Patent Office 3,493,670
Patented Feb. 3, 1970

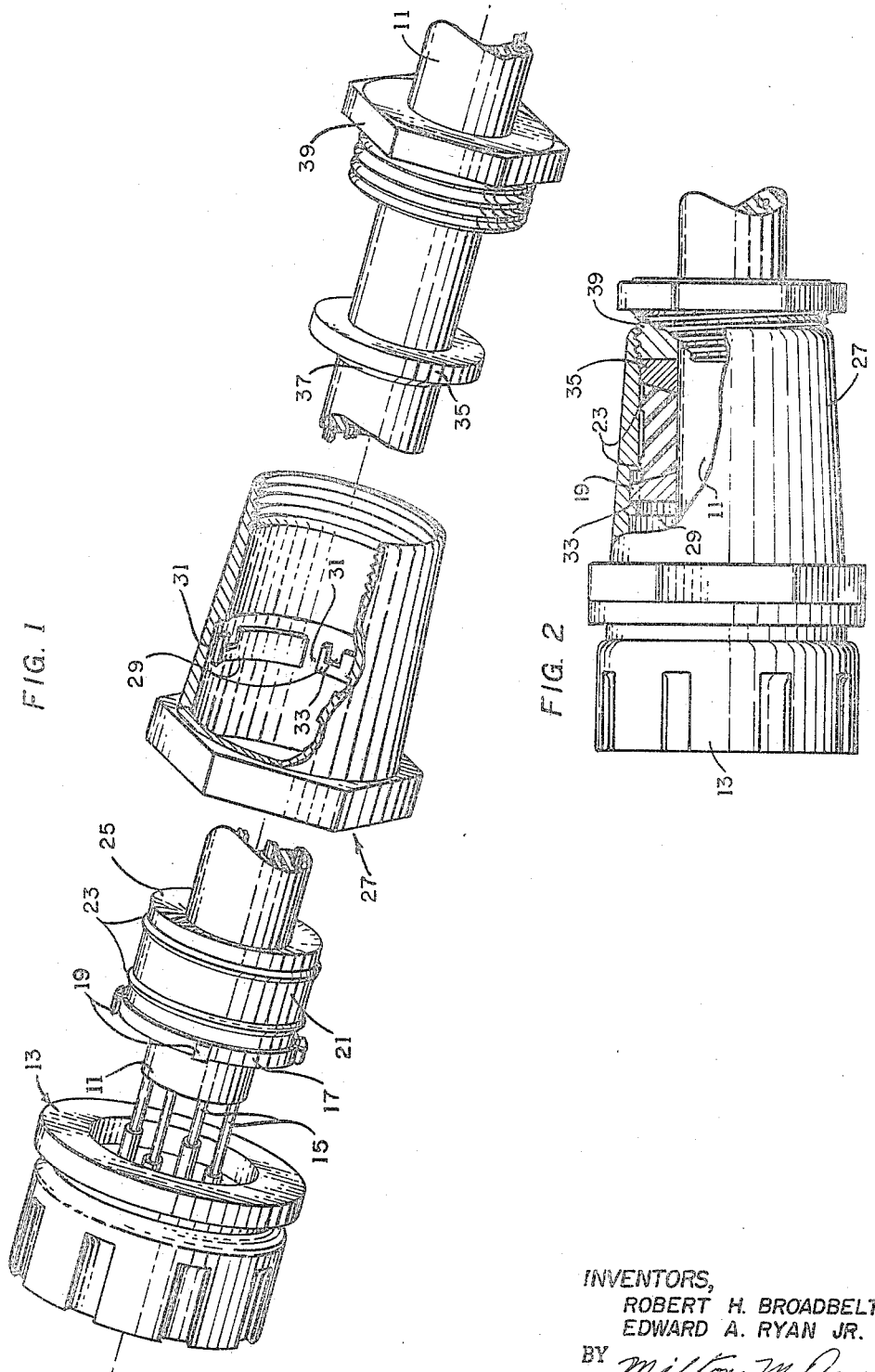

3,493,670
CABLE CONNECTOR
Robert H. Broadbelt, Manasquan, and Edward A. Ryan, Jr., West Long Branch, N.J., assignors to the United States of America as represented by the Secretary of the Army
Filed Sept. 24, 1968, Ser. No. 762,064
Int. Cl. H02g 3/18
U.S. Cl. 174—65        4 Claims

ABSTRACT OF THE DISCLOSURE

A cable connector for multi-strand wire cables that includes a keyed ring and a resilient sealing gland. The ring and gland are bonded to the cable and the ring is adapted to engage blind radial keyways within the cable housing to provide a sealed housing and stress-free assembly.

---

The invention described herein may be manufactured, used, and licensed by or for the Government for governmental purposes without the payment to us of any royalty thereon.

BACKGROUND OF THE INVENTION

In the use of multiconductor jacketed cable, particularly in military usage, there is frequent requirement to maintain the cable in continuity where there is a break or other failure of the cable in field use. In the preparation of the renewed connection between the cable and the housing, certain characteristic functions are particularly desirable, namely, first there should be no pull-out or push-in of the cable, second there should be no rotation of the cable within the housing, and third means should be provided to seal the cable housing assembly. The above objectives are desired in view of the fact that one of the major areas of failure in general purpose multicontact cable is in the connection of the cable to the connector. Failures result from cable pull-out or twisting of the cable in the housing which may entail conductor shorting. Another cause of failure results from compression set of the cable, i.e., overcuring of the seal and cable jacket which can result in the loss of an effective seal.

One widely used approach in making cable to housing connections is the use of cable retention clamps which are commonly known as strain relief clamps. These clamps consist of two metal bars which clamp the cable at the rear of the cable housing. Clamping the cable at this point is objectionable since it places the conductors on the outside of the bend of the cable in tension and the conductors on the inside of the bend of the cable in compression, both of which may cause conductor failure.

SUMMARY OF THE INVENTION

It is the general purpose of this invention to provide a connecting means between a multiconductor cable and its associated connector shell that is adaptable particularly for field repair use wherein the maximum pressure exerted on the cable is only that required to provide sealing of the assembly and at the same time allowing the conductors freedom of movement when the cable is flexed. To attain this the present invention contemplates the use of a sealing gland and a ring having axially disposed radial keys that are bonded to the cable, and a cable housing that includes blind radial keyways that mesh with said ring keys and further provided with a thrust washer and gland nut to secure the entire assembly.

BRIEF DESCRIPTION OF THE DRAWING

The exact nature of this invention will be readily apparent from consideration of the following specification relating to the annexed drawing in which:
FIGURE 1 is an exploded view, partly in section, of the connector of the instant invention; and
FIGURE 2 is an elevational assembly view, partly cut away, of the connector shown in FIGURE 1.

DESCRIPTION OF THE PREFERRED EMBODIMENT

Referring to FIG. 1, the connector of the instant invention can be most readily described by identifying the discrete components reading from left to right as shown in said figure. The cable to be connected is designated 11. At the extreme left of the drawing is shown the connector shell and coupling ring 13 which is adapted to mechanically and electrically receive the conductors 15 of the cable 11. Rigidly secured to and surrounding the cable 11 is a metallic ring 17 provided with a series of spaced keys 19 about the outer peripheral edge of the ring. Next in line and in abutment with the ring 17 is sealing gland 21 made of rubber or similar resilient material. The gland 21 is further provided with a series of protruding circumferential ribs 23. As shown in the drawing the free end of the gland terminates in a concavity 25, the function of which will be hereinafter described. Encompassing the cable 11 is an internally threaded cable housing 27, adapted to be axially positioned and slidable along cable 11. The cut away portion clearly portrays the internal structure of the housing which shows a portion of the housing as a shoulder 29 which is provided with a series of axially aligned slots 31 which are of slightly larger width than the keys 19, so as to permit the keys to ride through said slots. Positioned immediately adjacent to each of the slots 31 are a series of blind radial keyways 33 of width and depth so as to be able to accommodate the keys 19 when the housing 27 is axially positioned along cable 11 and rotated about the ring 17. Next in line is shown a metallic thrust washer 35 having an outside diameter slightly smaller than the bore diameter of the housing 27. The leading or left side edge of the washer 35 is tapered as shown at 37, the angle of the taper being such that it will tightly engage the concavity 25 of the gland 21 when the washer is urged into engagement as described hereinafter. Completing the assembly is a nut 39 that includes a forward extended threaded portion that serves to press the washer 35 into engagement partially within the gland 21.

The connector of the invention describe herein has particular adaptability for making field repairs. In such instances the housing is unlocked from its assembled position such as shown in FIG. 2. This is accomplished by rotating the housing 27 which is then released by movement through the slots 31. The assembly of the cable 11 to the connector 13 is accomplished by first cutting the cable to the required length, then the nut 39, washer 35 and housing 27 are pushed back on the cable in that order. The cable jacket is removed to proper strip length exposing the desired length of individual conductors. At this time the sealing gland 21 and the ring 17 are positioned on the cable at a predetermined distance from the end of the cable and bonded in position by vulcanizing or adhesives and permitted to cure. The individual conductors are then stripped and terminated to the contacts by crimping or soldering. The cable housing 27 is then slipped forward over the secured ring 17 and gland 21. The ring 17 is slotted through the axial aligned slots 31 of the housing shoulder 29. After the shoulder is forward of the ring 17 it is free to be rotated for the purpose of securing the housing 27 to the connector shell 13 by any conventional means. After securing the housing and the shell, the keys 19 are rotated by twisting the cable and pushed forward until the keys 19 are locked into the keyways 31.

At this point the washer 35 along with the nut 39 which is tightened sufficiently to effect compression of the gland 21 to effect a sealing action between the gland and the housing. At the same time the ring 17 is pushed forward and the keys 19 thereon are finally locked in the blind radial keyways 31 of the housing.

While there has been described what is at present considered to be the perferred embodiment of this invention, it will be obvious to those skilled in the art that various changes and modifications may be made therein without departing from the invention, and it is therefore aimed to cover all such changes and modification as fall within the true spirit and scope of the invention.

What is claimed is:

1. A cable connector to insure the continuity of the cable in field use which comprises a ring having a series of spaced axially and radially keys on the outer peripheral edge of said ring, a sealing gland of resilient material that engirdles said cable in abutment with said ring, said ring and said gland being secured about said cable, an interally threaded movable housing encompasses said cable having an internal shoulder which includes a series of axial slots that are slightly larger than the keys on said ring, and a series of keyways on said shoulder spaced from said slots to accommodate the ring keys, a circular washer adapted to engage said sealing gland and a nut having an extending threaded portion threadably engageable in said cable housing.

2. A connector of the kind set forth in claim 1 wherein said sealing gland is provided with a series of raised ribs on its outer peripheral surface.

3. A connector of the kind set forth in claim 1 wherein said sealing gland terminates in a concave portion at its free end.

4. A connector of the kind set forth in claim 1 wherein the end of said washer in abutments with said sealing gland is tapered.

References Cited

UNITED STATES PATENTS 3,158,680   11/1964   Lovitt et al. _____ 174—88

FOREIGN PATENTS 869,653   3/1953   Germany.

MARVIN A. CHAMPION, Primary Examiner

J. H. McGLYNN, Assistant Examiner

U.S. Cl. X.R.

339—94; 174—77